US00RE34278E

United States Patent [19]

Beswick

[11] E Patent Number: Re. 34,278

[45] Reissued Date of Patent: Jun. 8, 1993

[54] STEEL WITH A COMPOSITION OF IRON, CARBON, SILICON, PHOSPHORUS AND MOLYBDENUM

[75] Inventor: John M. Beswick, Montfoort, Netherlands

[73] Assignee: SKF Engineering & Research Center B.V., Nieuwegein, Netherlands

[21] Appl. No.: 954,776

[22] Filed: Sep. 30, 1992

Related U.S. Patent Documents

Reissue of:

[64] Patent No.: 4,961,904
Issued: Oct. 9, 1990
Appl. No.: 334,243
Filed: Apr. 6, 1989

[51] Int. Cl.[5] ..... C22C 38/12

[52] U.S. Cl. ..... 420/123; 420/8

[58] Field of Search ..... 148/320, 906; 420/123, 420/8

[56] References Cited

U.S. PATENT DOCUMENTS 3,306,734 2/1967 Aksoy et al. ..... 420/123

FOREIGN PATENT DOCUMENTS 54-40226 3/1979 Japan ..... 148/906

*Primary Examiner*—Deborah Yee
*Attorney, Agent, or Firm*—Eugene E. Renz, Jr.

[57] ABSTRACT

A steel composition containing iron, carbon, silicon, phosphorus and molybdenum, comprised of about 0.85–0.95 percent by weight carbon, up to about 0.1 percent by weight silicon, up to about 0.015 percent by weight phosphorus, about 0.20–0.4 percent by weight molybdenum, with the remainder percent by weight being iron.

3 Claims, 2 Drawing Sheets

STEEL WITH A COMPOSITION OF IRON, CARBON, SILICON, PHOSPHORUS AND MOLYBDENUM

Matter enclosed in heavy brackets [ ] appears in the original patent but forms no part of this reissue specification; matter printed in italics indicates the additions made by reissue.

FIELD OF THE INVENTION

The invention pertains to a new steel composition with an improved strength property, composed of iron, carbon, silicon, phosphorus and molybdenum.

BACKGROUND OF THE INVENTION

A similar composition of steel is known under the designation SKF3; the SKF3 steel is composed of 0.9–1.10 percent by weight carbon, 0.25–0.4 percent by weight silicon, maximum 0.025 percent by weight phosphorus and maximum 0.10 percent by weight molybdenum, in addition to iron. The SKF3 steel is commonly used to manufacture roller bearings.

The strength of steel is a major mechanical property. It is especially important in roller bearings, as it has great significance in the durability of bearings. Although it is possible to use the known SKF3 steel to make bearings with good mechanical properties, by increasing the strength of the steel, the durability of the bearings would likewise be increased. This is especially important for applications in aviation and space exploration and in heavy-duty gear boxes, lathes and the like. In applications such as these, the life span of the roller bearings is of crucial significance with regard to safety and security. The life span of the roller bearings is directly impacted by the durability of the bearing. The durability of the roller bearing is dependent upon the strength properties of the steel. Therefore, the increased strength properties will increase the life span of the bearings and result in greater safety and security.

Consequently, there is an urgent need for a type of steel with improved strength performance for the manufacture of roller bearings to be used successfully in technical areas requiring great safety, reliability and limited maintenance of the bearings in heavy-duty systems.

SUMMARY OF THE INVENTION

The objective of the invention is to produce a steel composition with increased strength capabilities to be used in roller bearings with the result of greater durability of those bearings.

For this purpose, the invention concerns steel which is comprised of iron, about 0.85–0.95 percent by weight carbon, about 0.1 percent by weight silicon, about 0.015 percent by weight phosphorus, and about 0.2–0.4 percent by weight molybdenum. The strength properties of the steel described herein proved to be much better than those of known steel for bearings.

Due to these remarkably improved strength properties, the steel presently described is very suitable for the manufacture of high-grade roller bearings. The steel is particularly useful in technical areas where reliability, safety and durability of bearings is important, as mentioned previously. In this context, the application of a greater strength steel is most notable in high grade roller bearings used in aviation and space exploration, in heavy-duty gear boxes of heavy vehicles, and in heavy-duty high-speed lathes.

BRIEF DESCRIPTION OF THE DRAWINGS

These and other objects of the present invention and the various features and details of the operation thereof are hereinafter more fully set forth with reference to the accompanying drawings, where.

DETAILED DESCRIPTION OF THE PREFERRED EMBODIMENT

Preferably, the steel according to the invention will contain about 0.88 percent by weight carbon, about 0.05 percent by weight silicon, about 0.0075 percent by weight phosphorus and 0.30 percent by weight molybdenum, with the remainder percent by weight being iron.

The strength of the new steel according to the invention, referred to in short as MMM steel or steel, was compared to the strength of the known SKF3 steel. For this purpose, both types of steel were subjected to a so-called slow bending test, whereby grooves were cut in steel plates prior to the test.

In principle, the test was performed according to the procedures described in ASTM E 812-81; the ground test pieces were 10×10×55 mm long. Grooves were cut in the test pieces by means of a fine grinding disc. The grooves were 0.15 mm wide and 0.15 mm deep.

A triple point bend test clamp was used; the friction effects were kept to a minimum through the use of bearing rollers with a 40 mm expansion length. Pressure was applied with a tensile strength machine; the maximum load was used for the computation of the breaking strength of the material in MP a units, etc. This value represents the apparent strength of the material in the presence of a groove with a specific shape, i.e., the strength relative to the energy required for unstable crack propagation.

Figure 1:
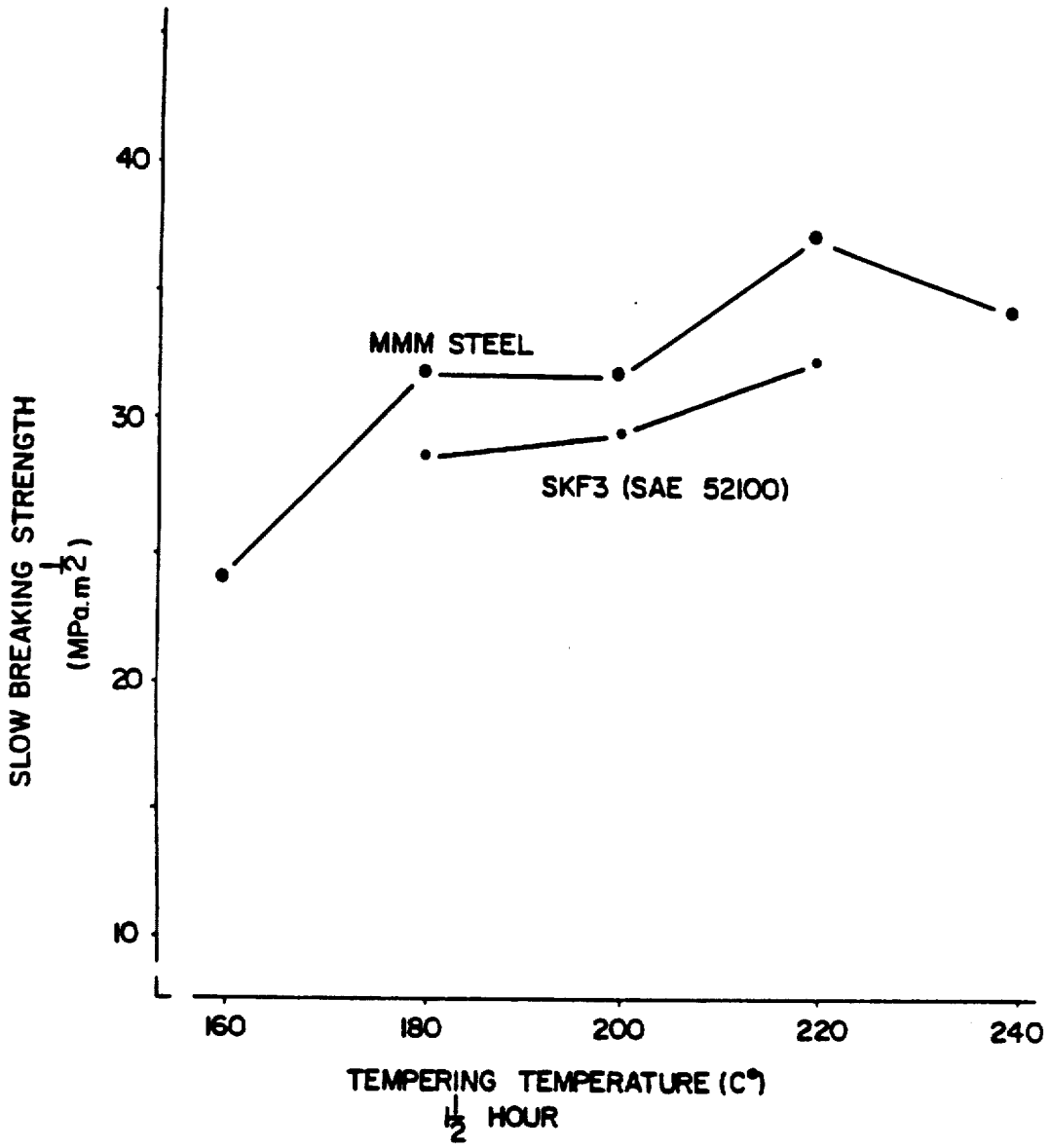
FIG. 1 is a comparison graph showing the relative strength of the MMM steel as compared to the SKF3 steel. Results of a so-called slow bending test were plotted along the graph. The slow bending strength is plotted as a function of the tempering temperature after martensite hardening at 860° C. (for 20 minutes) and oil quenching at 50° C.

The results are shown in FIG. 1, where the slow bending strength is plotted as a function of the tempering temperature, after martensite hardening at 860° C. (for 20 minutes) and oil quenching at 50° C.

The figure shows clearly that the strength of the new steel according to the invention, i.e., the MMM steel, is significantly improved compared to the strength of the known SKF3 steel.

Finally, roller bearings manufactured from the MMM steel according to the invention and from the known SKF3 steel were subjected to the durability test.

The bearings used for this test were commercially available 6205 DGBB (25 mm bore). To obtain the right kind of damage on the races, all bearings underwent a test run on a test installation for half an hour, with an impure oil lubricant, a load of 1.4 kN and an axial speed of 5000 rpm. The impurity consisted mainly of metal with some silicon dioxide filings derived from used gear boxed. The particles did have a specific size distribution of up to maximum 40 μm. The concentration of the particles in the lubrication system was 40 mg/l. After the test run the bearings were taken apart, cleaned, and reassembled. Subsequently, the durability tests were performed by means of so-called R2 durability test machines, with a purely radial load of 5 kN and an axial speed of 6000 rpm. The test bearings were operated at a temperature of 53° C. and were lubricated with a "pure" mineral oil of the commercially available Shell Turbo T68 type.

The bearings were tested in such manner that a preset vibration level was exceeded, i.e., the bearing life was exceeded. The present level was chosen so that any development of surface unevenness due to fatigue of the race could be detected. After subsequent examination of the inner race it appeared that the main type of damage was a splintering of the races; the splintering started at impact sites generated during the test run with impurities.

Subsequently, the life span of the bearings was assessed with the aid of Weibull statistics.

Figure 2:
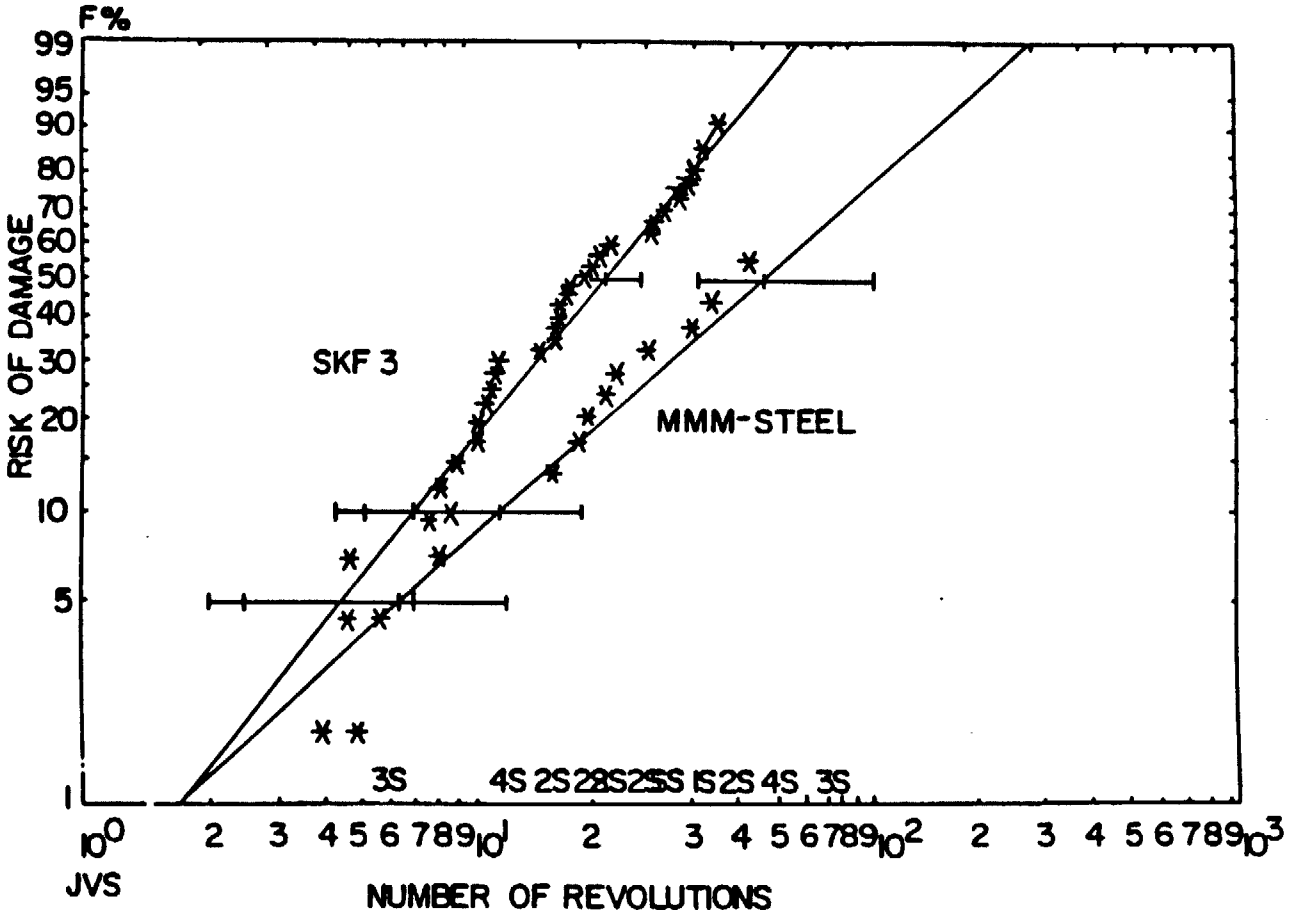
FIG. 2 is a graph showing the results of durability tests performed on roller bearings manufactured from the MMM steel according to the invention; and roller bearings manufactured from the known SKF3 steel. The graph shows the probability of deviation as a function of the number of revolutions.

The results are presented in FIG. 2. FIG. 2 shows the probability of deviation as a function of the number of revolutions. The figure shows clearly that the MMM steel according to the invention has a significantly lower risk of failure than the known SKF3 steel for the same number of revolutions, which means that the durability of MMM steel is significantly better than that of the known SKF3 steel.

While particular embodiments of the present invention have been illustrated and described herein, it is not intended to limit the invention and changes and modifications may be made therein within the scope of the following claims.

I claim:

1. Steel with a composition consisting of about 0.85–0.95 percent by weight carbon, up to about 0.1 percent by weight silicon, up to about 0.015 percent by weight phosphorus, about 0.20–0.4 percent by weight molybdenum and the remainder by weight being iron.

2. Steel with a composition according to claim 1, comprising 0.88 percent by weight carbon, 0.05 percent by weight silicon, 0.0075 percent by weight phosphorus, 0.25 percent by weight molybdenum and the remainder percent by weight being iron.

*3. Steel with a composition consisting essentially of about 0.85–0.95 percent by weight carbon, up to about 0.1 percent by weight silicon, up to about 0.015 percent by weight phosphorus, about 0.20–0.4 percent by weight molybdenum and the remainder by weight being iron.*

* * * * *